(12) United States Patent
Delfini et al.

(10) Patent No.: US 8,161,652 B2
(45) Date of Patent: Apr. 24, 2012

(54) HAND-HELD POWER TOOL

(75) Inventors: Stefano Delfini, Bettlach (CH); Beat Gerber, Oberuchsiten (CH); Miguel Alexandre Pinto Da Costa, Langendorf (CH)

(73) Assignee: Robert Bosch GmbH, Stuttgart (DE)

( * ) Notice: Subject to any disclaimer, the term of this patent is extended or adjusted under 35 U.S.C. 154(b) by 630 days.

(21) Appl. No.: 12/297,478

(22) PCT Filed: Oct. 29, 2007

(86) PCT No.: PCT/EP2007/061579
§ 371 (c)(1),
(2), (4) Date: Oct. 17, 2008

(87) PCT Pub. No.: WO2008/080649
PCT Pub. Date: Jul. 10, 2008

(65) Prior Publication Data
US 2009/0100682 A1 Apr. 23, 2009

(30) Foreign Application Priority Data
Dec. 27, 2006 (DE) .......................... 10 2006 061 623

(51) Int. Cl.
*B25F 3/00* (2006.01)
(52) U.S. Cl. .......................................... 30/124; 30/166.3
(58) Field of Classification Search .................... 15/344, 15/350, 412; 408/58, 67; 409/137, 182, 409/219; 451/451, 456; 30/124, 166.3, 380–394
See application file for complete search history.

(56) References Cited

U.S. PATENT DOCUMENTS

| 2,631,619 | A | | 3/1953 | Folli | |
|---|---|---|---|---|---|
| 4,412,381 | A | * | 11/1983 | Kirk | 30/124 |
| 4,414,743 | A | | 11/1983 | Pioch et al. | |
| 4,783,207 | A | * | 11/1988 | Nagashima et al. | 30/388 |
| 4,788,769 | A | * | 12/1988 | Maruyama | 15/344 |
| 4,985,999 | A | * | 1/1991 | Iwasaki et al. | 30/133 |
| 5,074,044 | A | | 12/1991 | Duncan et al. | 30/124 |
| 5,588,289 | A | * | 12/1996 | Wilson | 30/124 |
| 5,878,607 | A | * | 3/1999 | Nunes et al. | 30/124 |
| 6,047,693 | A | * | 4/2000 | Yamami et al. | 30/124 |
| 6,155,246 | A | * | 12/2000 | Yamami et al. | 451/456 |
| 6,851,898 | B2 | * | 2/2005 | Ege et al. | 408/67 |
| 7,047,647 | B1 | * | 5/2006 | Muller et al. | 30/124 |
| 7,325,273 | B2 | | 2/2008 | Thanner et al. | |
| 7,909,114 | B2 | * | 3/2011 | Nishikawa et al. | 408/67 |
| 2009/0165312 | A1 | * | 7/2009 | Haas et al. | 30/390 |

FOREIGN PATENT DOCUMENTS

| DE | 964 638 | | 5/1957 |
|---|---|---|---|
| DE | 34 44 116 | | 6/1986 |
| DE | 102006061623 A1 | * | 7/2008 |
| EP | 0 752 240 | | 1/1997 |
| EP | 1563 936 | | 8/2005 |
| JP | 58149120 A | * | 9/1983 |
| JP | 01068562 A | * | 3/1989 |
| JP | 01068564 A | * | 3/1989 |
| JP | 01297096 A | * | 11/1989 |

* cited by examiner

*Primary Examiner* — Jason Daniel Prone
(74) *Attorney, Agent, or Firm* — Michael J. Striker

(57) ABSTRACT

A hand-held power tool, in particular a hand-held power tool for sawing, includes a drive unit (12a), which includes a drive shaft (14a; 14b), and a dust-extraction device (16a; 16b) with a suction unit (20a; 20b) and a drive shaft (22a; 22b). A transmission unit (24a; 24b) is installed upstream of the drive shaft (22a; 22b) of the suction unit (20a; 20b).

9 Claims, 3 Drawing Sheets

HAND-HELD POWER TOOL

CROSS-REFERENCE

The invention described and claimed hereinbelow is also described in PCT/EP2007/061579, filed on Oct. 29, 2007, and DE 102006061623.5, filed on Dec. 27, 2006. This German Patent Application, whose subject matter is incorporated here by reference, provides the basis for a claim of priority of invention under 35 U.S.C. 119 (a)-(d).

BACKGROUND OF THE INFORMATION

The present invention is directed to a hand-held power tool.

A hand-held power tool for sawing, which includes a drive unit with a drive shaft, has already been described. The hand-held power tool also includes a dust-extraction device with a suction unit and a drive shaft.

SUMMARY OF THE INVENTION

The present invention is directed to a hand-held power tool, in particular a hand-held power tool for sawing, with a drive unit, which includes a drive shaft, and a dust-extraction device with a suction unit and a drive shaft.

It is provided that the hand-held power tool includes a transmission unit, which is installed upstream of the drive shaft of the suction unit, thereby making it possible, advantageously, to modify the rotational speed, torque, direction of rotation, and/or force-flow direction. In particular, a force-flow direction may be advantageously adapted to an installation space. In this context, a "transmission unit" refers to a unit that is provided to transfer and/or convert forces and/or moments; a conversion of a force and/or a moment preferably brings about a change in a magnitude of a force and/or a moment, a change in a rotational speed and/or a moment, and/or a change in a force-flow direction. The dust-extraction device and/or the suction device preferably include(s) a fan for creating a suction-air flow, which is set into rotation via the drive shaft. The dust-extraction device is provided, in particular, to suction up dust and/or dirt during normal operation of the hand-held power tool, which, in particular, is designed as a hand-held power tool with an operating mode provided for sawing, e.g., a jigsaw, or further hand-held power tools that appear reasonable to those skilled in the art.

It is also provided that the transmission unit is located between the drive shaft of the drive unit and the drive shaft of the dust-extraction device, thereby making it possible using simple design means to advantageously use a drive torque that is generated to drive the hand-held power tool to also generate a suction-air flow inside the dust-extraction device. In this context, "between" means, in particular, being located between two units along a force-flow direction. Basically, the dust-extraction device may also include its own drive unit, which is different from the drive unit used to drive the hand-held power tool, and which generates a drive torque, the drive torque being transferred from the transmission unit via a drive shaft to the suction unit and/or a fan of the suction unit.

It is also provided that the transmission unit is designed as a bevel gear, thereby making it possible to attain a particularly space-saving design of the transmission unit and, therefore, to realize a particularly compact design of the hand-held power tool. Via the bevel gear, it is possible for the drive shaft of the drive unit and the drive shaft of the suction unit to extend in parallel with one another, slanted relative to one another, and/or toward one another.

A particularly space-saving design of the dust-extraction device inside the hand-held power tool may be advantageously attained when the drive shaft of the dust-extraction device is located such that it is slanted relative to the drive shaft of the drive unit. The expression "slanted toward one another" means, in particular, that an orientation—preferably a rotation axis—of the drive shaft of the dust-extraction device forms an angle with an orientation—preferably a rotation axis—of the drive shaft of the drive unit that is preferably greater than 0° and is preferably less than 180°.

In an advantageous refinement of the present invention, it is provided that the drive shaft of the dust-extraction device is slanted relative to the drive shaft of the drive unit essentially by 90°, thereby making it possible to attain an advantageous separation of dust and dirt by utilizing gravity in a normal operating position of the hand-held power tool. The drive shaft of the dust-extraction device preferably has a drive direction that is oriented in the direction of gravity in the normal operating position of the hand-held power tool, a dust-collection means of the dust-extraction device being expediently located in the direction of gravity, as viewed from the drive shaft. In this context, "essentially by 90°" means that an angle of inclination of the drive shaft of the dust-extraction device relative to the drive shaft of the drive unit is 90°±5°, given tolerance considerations.

It is also provided that the dust-extraction device includes a separating unit, which is installed upstream of the suction unit relative to a suction-air flow of the dust-extraction device, thereby making it possible to realize an advantageous separation of dust and dirt, so that a suction-air flow that is cleansed of dust and dirt particles flows through the suction unit, in particular through a fan of the suction unit. This also makes it possible, advantageously, to increase the service life of the suction unit.

A particularly high flexibility of the hand-held power tool for use in different applications may be advantageously attained for an operator of the hand-held power tool when the hand-held power tool includes coupling means via which the dust-extraction device is located in a manner such that it is detachable, in particular by an operator. The coupling means preferably enable an operator to install and/or remove the dust-extraction device on or from the hand-held power tool without the use of tools.

In a further embodiment of the present invention, it is provided that the separating unit includes a dust-collection container, which is detachably installed on the dust-collection device, thereby making it possible to attain removal and/or attachment of the dust-collection container using a simple design and, therefore, making it possible to attain increased comfort for an operator of the hand-held power tool.

It is also provided that the dust-collection container includes at least one cover, on which at least one dust-separating means of the dust-extraction device is located, thereby making it possible to attain a particularly secure and stable placement of the dust-separating means inside the dust-collection container, preferably in the region of the suction-air flow.

It is also provided that the cover includes at least one detent element, which is provided to enable the tool-free installation and/or removal of the cover, thereby making it advantageously possible for an operator to clean the dust-extraction means in a particularly comfortable manner.

BRIEF DESCRIPTION OF THE DRAWINGS

Further advantages result from the description of the drawing, below. Exemplary embodiments of the present invention are shown in the drawing. The drawing, the description, and the claims contain numerous features in combination. One skilled in the art will also advantageously consider the features individually and combine them to form further reasonable combinations.

DETAILED DESCRIPTION OF THE EXEMPLARY EMBODIMENTS

Figure 1:
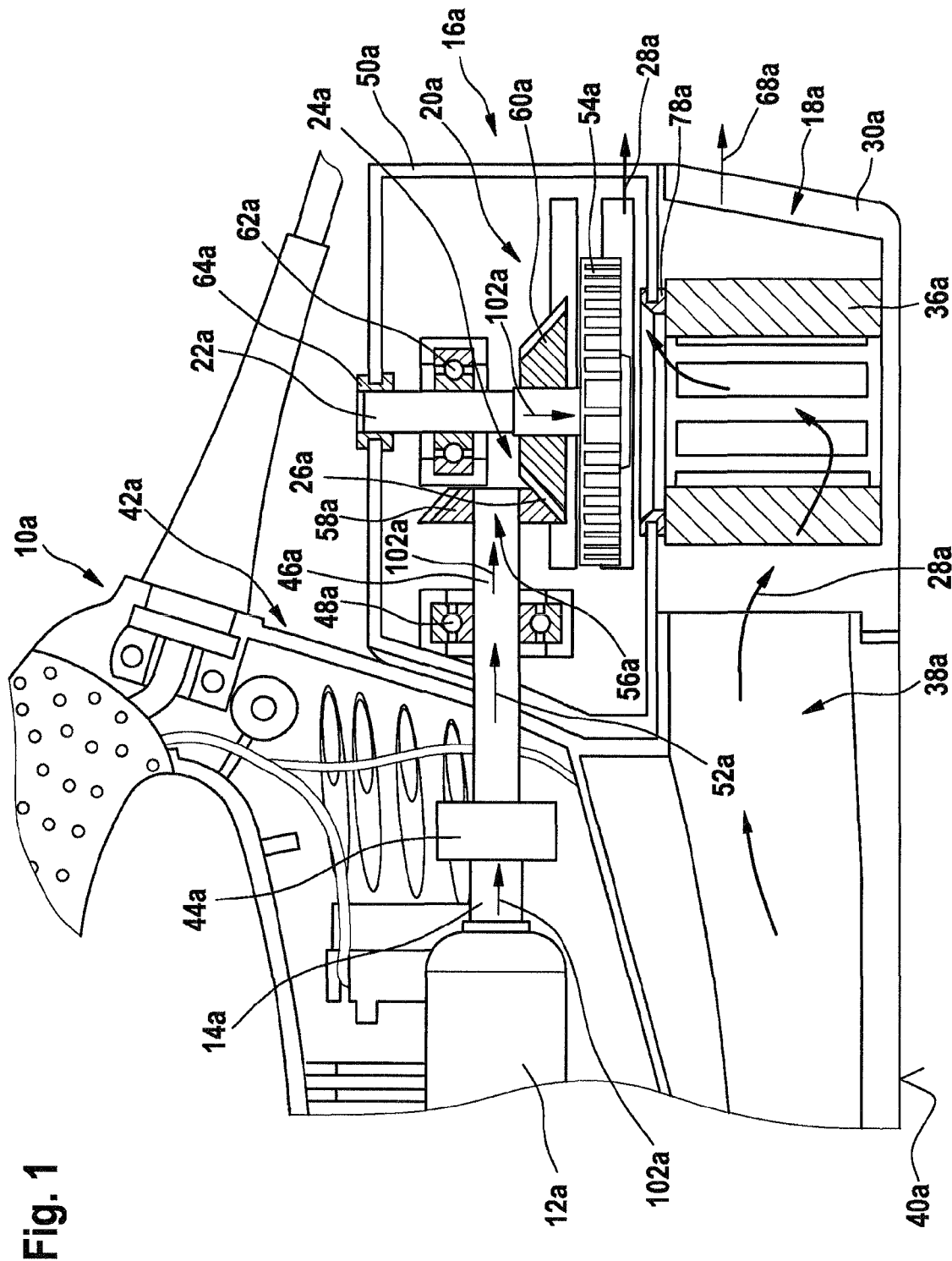
FIG. 1 shows a partial cross-section of a hand-held power tool according to the present invention with dust-extraction device, in a side view.

FIG. 1 shows a hand-held power tool 10a according to the present invention, which is designed as a jigsaw, with a dust-extraction device 16a, in a partial cross section. Hand-held power tool 10a includes a drive unit 12a with a drive shaft 14a. Hand-held power tool 10a also includes a suction channel 38a, which is located on a side 40a in hand-held power tool 10a facing a workpiece during operation of hand-held power tool 10a. During operation of hand-held power tool 10a, dust and dirt that are produced are suctioned via suction channel 38a in the region of the sawing tool and they are directed toward dust-extraction device 16a.

Figure 2:
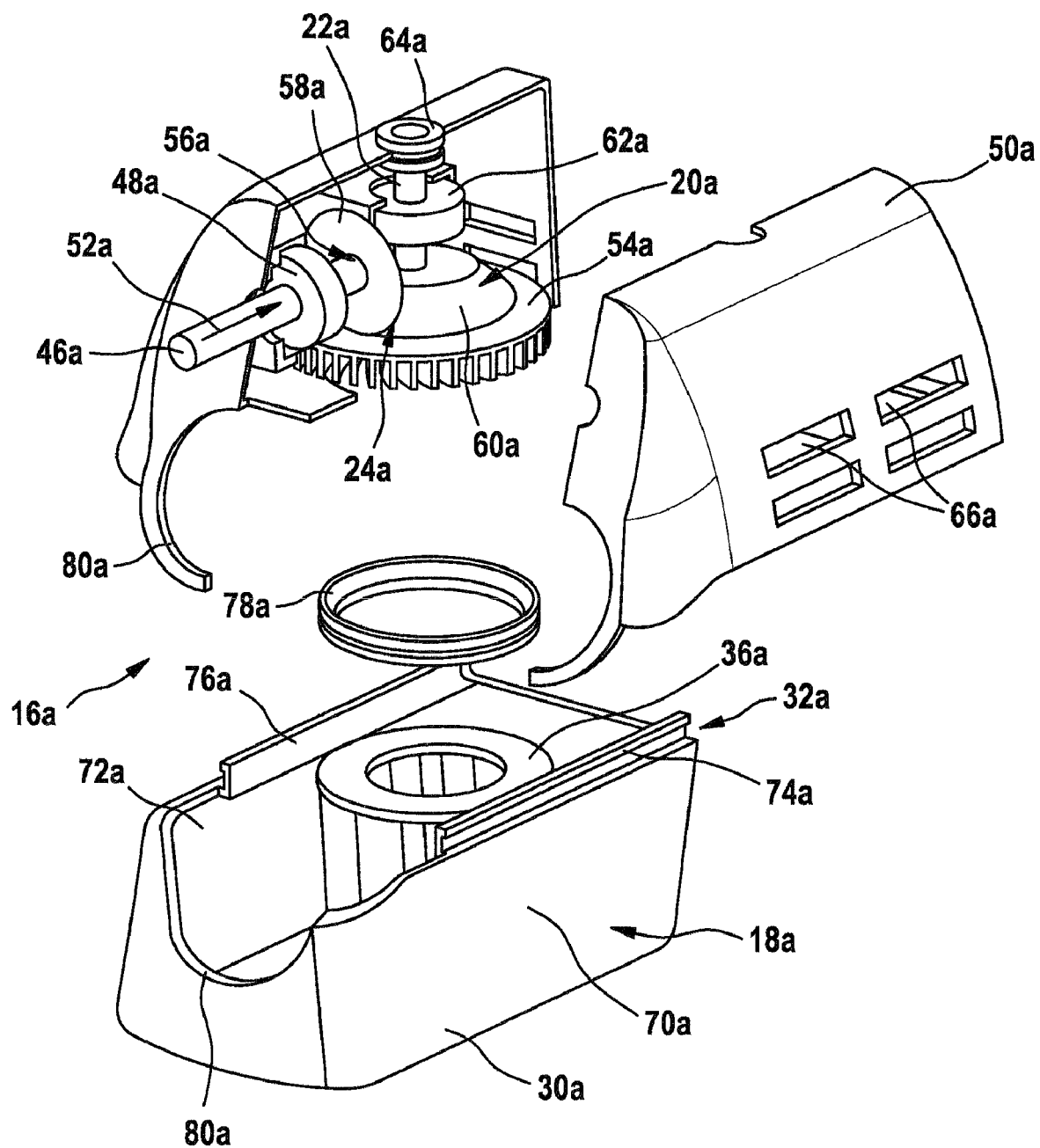
FIG. 2 shows the dust-extraction device in FIG. 1, in an exploded view.

Dust-extraction device 16a is provided for suctioning up dust and dirt particles during operation of hand-held power tool 10a, and it is located on a rear side 42a of hand-held power tool 10a that faces away from the sawing tool (FIG. 1). Dust-extraction device 16a includes a separating unit 18a, a suction unit 20a, and a drive shaft 22a. A drive of dust-extraction device 16a takes place via drive unit 12a and/or drive shaft 14a of hand-held power tool 10a, which, during operation of hand-held power tool 10a, transfers a drive torque via a coupling means 44a to an intermediate shaft 46a of dust-extraction device 16a along a force-flow direction. Intermediate shaft 46a is oriented coaxially with drive shaft 14a of drive unit 12a, and it is supported inside dust-extraction device 16a in an axial direction 52a via a ball bearing 48a against a housing 50a of dust-extraction device 16a. In addition, during operation of hand-held power tool 10a, intermediate shaft 46a transfers the drive torque to a transmission unit 24a, which is located inside dust-extraction device 16a (FIGS. 1 and 2).

Transmission unit 24a is provided to transfer a drive torque to drive shaft 22a of dust-extraction device 16a; when the transfer takes place, a direction and/or a rotational speed of the drive torque changes. For this purpose, transmission unit 24a is designed as a bevel gear assembly 26a and it transfers a torque to drive shaft 22a of dust-extraction device 16a, which is provided to drive a fan 54a of suction unit 20a, drive shaft 22a of dust-extraction device 16a being oriented perpendicularly to intermediate shaft 46a. Intermediate shaft 46a is non-rotatably connected with a bevel gear 58a on an end 56a of intermediate shaft 46a that faces away from drive shaft 14a of drive unit 12a. During operation of hand-held power tool 10a and/or dust-extraction device 16a, bevel gear 58a of intermediate shaft 46a meshes with a further bevel gear 60a, which is non-rotatably mounted on drive shaft 22a of dust-extraction device 16a. Via bevel gear assembly 26a, the drive torque of intermediate shaft 46a is transferred to drive shaft 22a of dust-extraction device 16a and to fan 54a of suction unit 20a along a force-flow direction 102a. Drive shaft 22a of dust-extraction device 16a is supported via a ball bearing 62a and a guide 64a, which is located in housing 50a of dust-extraction device 16a, in housing 50a of dust-extraction device 16a perpendicularly to intermediate shaft 46a and perpendicularly to side 40a of hand-held power tool 10a that faces the work piece. An alternative orientation—that appears reasonable to those skilled in the art—of drive shaft 22a of dust-extraction device 16a relative to intermediate shaft 46a and/or drive shaft 14a of drive unit 12a is also basically feasible. Drive shaft 22a of dust-extraction device 16a also transfers a drive torque to fan 54a of suction unit 20a, which is installed downstream of bevel gear 60a in axial direction 52a of drive shaft 22a in the direction of side 40a of hand-held power tool 10a facing the work piece (FIGS. 1 and 2).

Via fan 54a of suction unit 20a, a suction-air flow 28a is created in separating unit 18a, which is provided to suction up dust and dirt—during operation of hand-held power tool 10a—in a region of the tool, via suction channel 38a of hand-held power tool 10a. Fan 54a of suction unit 20a is located downstream of separating unit 18a of dust-extraction device 16a relative to suction-air flow 28a. Separating unit 18a includes a dust-extraction container 30a and a dust-separating means 36a that is designed as a filter means. Via suction-air flow 28a, the dust and dirt are suctioned up together with air and directed via suction channel 38a to separating unit 18a, which is installed upstream of suction unit 20a relative to suction-air flow 28a. The dust and dirt are separated out inside dust-collection container 30a using dust-separating means 36a, and the air that has been cleansed of the dust and dirt is directed further along suction-air flow 28a to fan 54a of suction unit 20a, where it escapes via ventilation openings 66a in housing 50a of dust-extraction device 16a shown in FIG. 2. An insulation ring 78a is located between fan 54a and dust-separating means 36a, which prevents suction air loaded with dust and dirt from being drawn directly into fan 54a.

Dust-collection container 30a of separating unit 18a includes a circumferential wall, which prevents dust and dirt from falling out of dust-collection container 30a when dust-collection container 30a is removed from hand-held power tool 10a. In addition, dust-collection container 30a of separating unit 18a is installed on housing 50a of dust-extraction device 16a such that it may it may be removed using a sliding mechanism 32a so that dust-separating means 36a may be cleaned (FIG. 2). When dust-collection container 30a is removed from dust-extraction device 16a, it is slid by an operator along a direction 68a (FIG. 1), which extends parallel to intermediate shaft 46a and leads away from hand-held power tool 10a. For this purpose, dust-collection container 30a includes—on opposite walls 70a, 72a, which extend parallel to direction 68a—one guide rail 74a, 76a each, which are guided into guide elements—which correspond thereto and are not depicted—of housing 50a of dust-extraction device 16a (FIG. 2).

In addition, entire dust-extraction device 16a may be removed from hand-held power tool 10a by an operator. Dust-extraction device 16a may be attached via intermediate shaft 46a, which is detachably connected via coupling means 44a with hand-held power tool 10a. Separating unit 18a and/or the wall of dust-collection container 30a also include(s) a recess 80a, which is adapted to suction channel 38a. Via a detachable connection, which is not depicted and which may be designed as a form-fit and/or non-positive and/or integral connection, separating unit 18a is connected with suction channel 38a, and/or dust-extraction device 16a is installed on or removed from hand-held power tool 10a.

Figure 3:
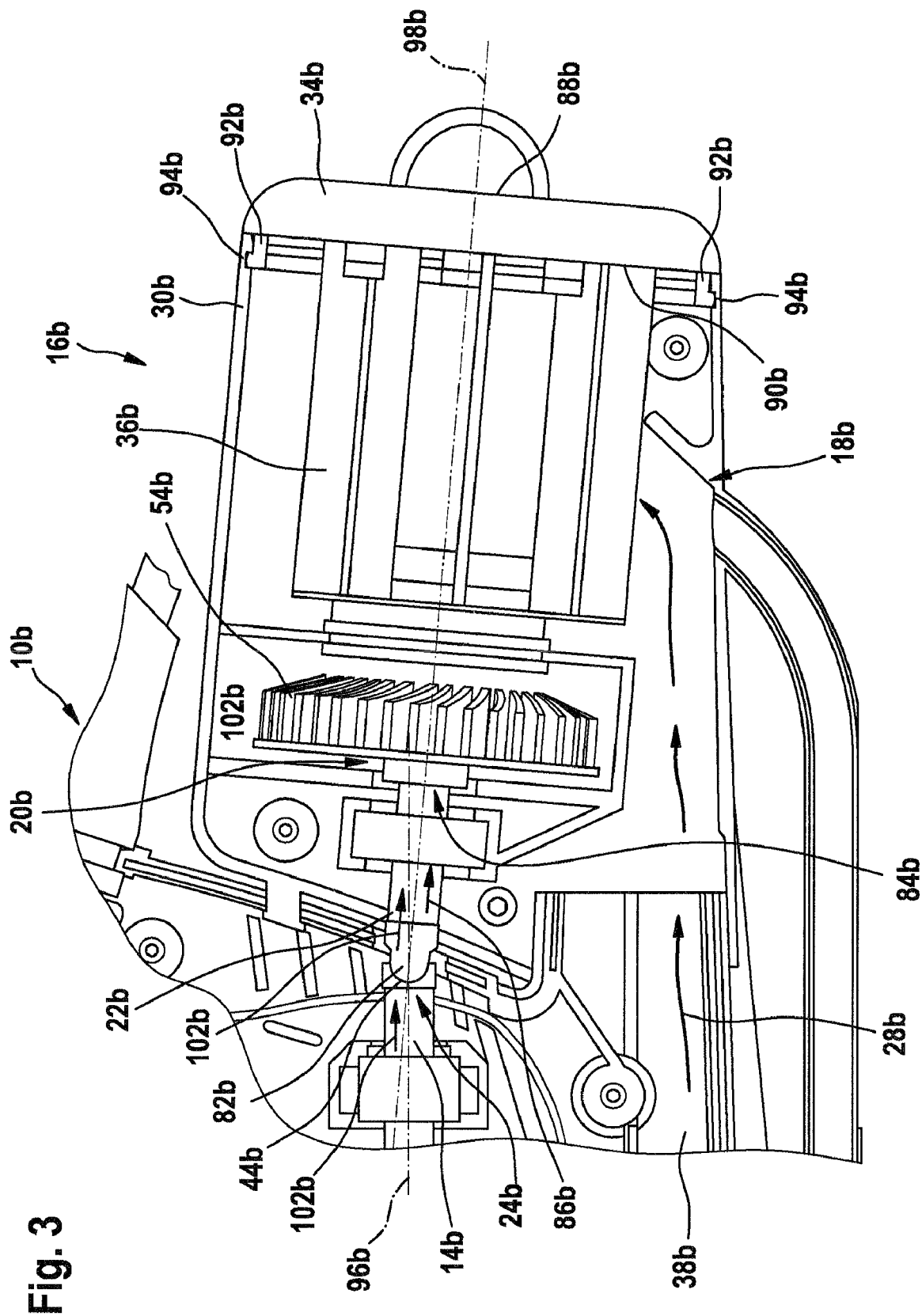
FIG. 3 shows the hand-held power tool with a dust-extraction device that is an alternative to that shown in FIG. 1, in a side view.

An alternative embodiment is shown in FIG. 3. Components, features, and functions that are essentially the same are labelled with the same reference numerals. To distinguish the exemplary embodiments from one another, the reference numerals of the exemplary embodiments are appended with the letters a and b. The description below is essentially limited to the differences from the exemplary embodiment in FIGS. 1 and 2. With regard for the components, features, and functions that remain the same, reference is made to the description of the exemplary embodiment in FIGS. 1 and 2.

FIG. 3 shows a hand-held power tool 10*b* with a dust-extraction device 16*b*, a drive shaft 14*b* of a drive unit—which is not depicted in FIG. 3—of hand-held power tool 10*b* being coupled directly to a drive shaft 22*b* of dust-extraction device 16*b* via a transmission unit 24*b*. Transmission unit 24*b* is designed as a cardan joint. Cardan joint 82*b* also includes a coupling means 44*b*, which enters into a connection—which is form-fit and/or non-positive, and, in particular, may be released by an operator—with drive shaft 22*b* of dust-extraction device 16*b*. A rotation axis 96*b* of drive shaft 22*b* of dust-extraction device 16*b* is oriented such that it is tilted relative to a rotation axis 98*b* of drive shaft 14*b* of the drive unit at an inclination angle of approximately 5° to 10°. Basically, further inclination angles that appear reasonable to those skilled in the art between rotation axes 96*b*, 98*b* of the two drive shafts 14*b*, 22*b* are also feasible in an alternative embodiment of the present invention.

A fan 54*b* of a suction unit 20*b* is non-rotatably located coaxially around drive shaft 22*b* of dust-extraction device 16*b* on an end 84*b* of drive shaft 22*b* that faces away from transmission unit 24*b*. A separating unit 18*b* is located downstream of fan 54*b*, in the direction of a drive direction 86*b* of drive shaft 22*b* of dust-extraction device 16*b*, which includes a dust-collection container 30*b* with a dust-separating means 36*b* located therein. To clean dust-collection container 30*b*, it includes a removable cover 34*b* on a side 88*b* of separating unit 18*b* that points in drive direction 86*b*. Dust-separating means 36*b* are located on cover 34*b*, on a side 90*b* that points inward, into dust-collection container 30*b*, so that dust-separating means 36*b*—together with cover 34*b*—may be removed by an operator of hand-held power tool 10*b* from separating unit 18*b* in order to clean dust-collection container 30*b*. For this purpose, cover 34*b* includes detent elements 92*b*, which engage in corresponding detent elements 94*b* on dust-collection container 30*b* in a form-fit manner. Cover 34*b* is connected via detent elements 92*b* with separating unit 18*b* such that it may be removed by an operator.

What is claimed is:

1. A hand-held power tool, in particular a hand-held power tool for sawing, comprising:
a drive unit (12*a*) which includes a drive shaft (14*a*);
a dust-extraction device (16*a*) with a suction unit (20*a*) and a drive shaft (22*a*);
a transmission unit (24*a*), which is arranged at least partially upstream of the drive shaft (22*a*) of the dust-extraction device (16*a*) relative to a flow-force direction (102); and
a coupling means (44*a*) configured for connecting the dust-extraction device (16*a*) to the drive shaft (14*a*) of the drive unit (12*a*) in a detachable manner,
wherein an operating ability of the drive unit (12*a*) is independent of whether the dust-extraction device (16*a*) is attached to or detached from the drive shaft (14*a*) of the drive unit (12*a*).

2. The hand-held power tool as recited in claim 1, wherein the transmission unit (24*a*) is located at least partially between the drive shaft (14*a*) of the drive unit (12*a*) and the drive shaft (22*a*) of the dust-extraction device (16*a*).

3. The hand-held power tool as recited in claim 1, wherein the transmission unit (24*a*) is composed of a bevel gear assembly (26*a*).

4. The hand-held power tool as recited in claim 1, wherein the dust-extraction device (16*a*) includes a separating unit (18*a*), which is arranged upstream of the suction unit (20*a*) relative to a suction-air flow direction (28*a*) of the dust-extraction device (16*a*).

5. The hand-held power tool as recited in claim 4, wherein the separating unit (18*a*) includes a dust-collection container (30*a*), which is removably connected to the dust-extraction device (16*a*).

6. The hand-held power tool as recited in claim 5, wherein said dust-collection container (30*a*) is fastened to a housing (50*a*) of the dust-extraction device (16*a*) in a detachable manner.

7. The hand-held power tool as recited in claim 6, wherein said dust-collection container (30*a*) includes at least one guide rail (74*a*; 76*a*) which is guided into at least one corresponding part of the housing (50*a*) of the dust-extraction device (16*a*).

8. The hand-held power tool as recited in claim 7, wherein said at least one guide rail (74*a*; 76*a*) is arranged on at least one wall (70*a*; 72*a*) of said container (30*a*) that extends parallel to a direction (68*a*) extending parallel to said drive shaft (14*a*) of the drive unit (12*a*).

9. The hand-held power tool as recited in claim 4, wherein an insulation ring (78*a*) is arranged between the suction unit (20*a*) and the separating unit (18*a*).

\* \* \* \* \*